3,318,780
PRESSURE-PROOF COMPLETELY ENCLOSED REACTOR CONTAINMENT STRUCTURE
Werner Bohmann, Christian Held, Arno Martin, Rudolf Göpel, Walter Wirths, and Werner Hünlich, Erlangen, and Ulrich Finsterwalder, Munich-Obermenzing, Germany, assignors to Siemens-Schuckertwerke Aktiengesellschaft, Berlin-Siemensstadt, Germany, a corporation of Germany
Filed Mar. 19, 1964, Ser. No. 353,298
Claims priority, application Germany, Mar. 20, 1963, S 84,244
10 Claims. (Cl. 176—87)

Our invention is related to a pressure-proof, completely enclosed reactor containment structure.

A main objective of containment structures for atomic energy plants, in the event of a possible accident which, for example, causes damage to the reactor proper, is to cushion or block the over-pressure produced thereby and to prevent the escape of the freed radioactive gases, vapors and particles into the open atmosphere. In other words, in the event of the slightest reactor accident, the surroundings of the reactor installation or the reactor power station or plant must not be affected. For this reason, the structure must not only sustain normal loads but must in addition be so constructed that it is able to withstand the internal pressure produced in the case of an accident.

Structures erected for this purpose until now consisted of steel or reinforced concrete for the most part and were predominately of cylindrical and spherical shape. The spatial configuration of these structural forms has however been limited in size by the strength of the materials and the methods of construction employed so that for example not all of the auxiliary equipment or facilities and certainly none of the turbine components were able to be located inside the containment structure. An extension in the form of upright cylinders with spherical domes which permits the housing of all the auxiliary equipment, has the disadvantage that the cylinder walls must be broken through to provide suitable access openings and that the circular cross section thereof is not traversible by the usual gantry crane. Furthermore, exceptional difficulties have arisen in prestressing a cylinder formed with large openings and even more so, the hemispherical dome closing off the top thereof, as well as in providing a stress-free union of both containment vessel components.

It is accordingly an object of our invention to provide a pressure-free completely enclosed reactor containment structure which avoids the disadvantages of the known containment structures.

Another object of our invention is to provide a structure of such form that, for an adequate height, has a floor space which is traversible by an average gantry crane, and not only the reactor proper but also, contrary to the known reactor structures, the auxiliary and associated equipment including the decay tank as well as the power turbines or other heat transfer apparatuses, can be located in that floor space.

A further object of our invention is to provide a structural form that, contrary to the usual steel containers, is also resistant to outward overpressure, which is true particularly for a structure of reinforced concrete.

Additional objects of our invention are to provide a structure which exhibits a very favorable ratio of base area to total volume so that almost the entire main installation or power plant can be installed inside the structure. The large volume also ensures a smaller pressure rise in the case of an accident than for the conventional reactor structures so that the safety of the entire installation is thereby substantially increased. The favorable ratio of the base area to the volume and its consequent aforementioned advantages as well as the excellent floor load distribution renders the choice of location completely independent of the floor conditions. Since we provide a containment structure with a relatively small outer height, direct radiation released due to an accident has a substantially smaller range than if released in the type of structures employed until now. Our structure is rotationally symmetrical and has an arcuate outline. The arcuate outline however, does not extend all the way to the rotary horizontal axis, but terminates short of the horizontal axis in access openings that are provided on the axis at the ends of the structure without any substantial disruption of the curved surfaces.

In accordance with our invention, we provide a containment structure which has the form of a body consisting of a hollow rotationally symmetrical vessel having a preferably horizontal axis and an arcuate outline and opposing side points on said axis which are cut off in order to attach or insert shielded pressure-proof transit locks capable of being closed.

In accordance with another aspect of our invention, the containment structure having a rotationally symmetrical shell with horizontal axis and arcuate outline is prestressed in the annular or circular direction, i.e. in planes perpendicular to the horizontal axis of symmetry, and from both openings in the direction of the external outline of the shell structure.

In order to facilitate production and if necessary also to increase the imperviousness thereof, the containment structure or housing can not only be constructed of one shell but also of two or more superimposed shells. The wall thickness necessary for the rotational shell depends not only on the mechanical strength requirements but also on the shielding effect which must be available against the escape of radioactivity to the surroundings in the event of an accident.

In accordance with another aspect of our invention, the lower part of the rotational shell which forms the safety containment structure can be constructed so as to simultaneously serve as a foundation member for the reactor and the other structures. Substantial simplifications are thus realized, particularly with regard to the foundation, and the large quantities of buildings material that are usually necessary are consequently reduced.

Other features which are considered characteristic for the invention are set forth in the appended claims.

Although the invention has been illustrated and described as a pressure-proof completely enclosed reactor containment structure and the method of constructing the same, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of a specific embodiment when read in connection with the accompanying drawings, in which.

Figure 1:
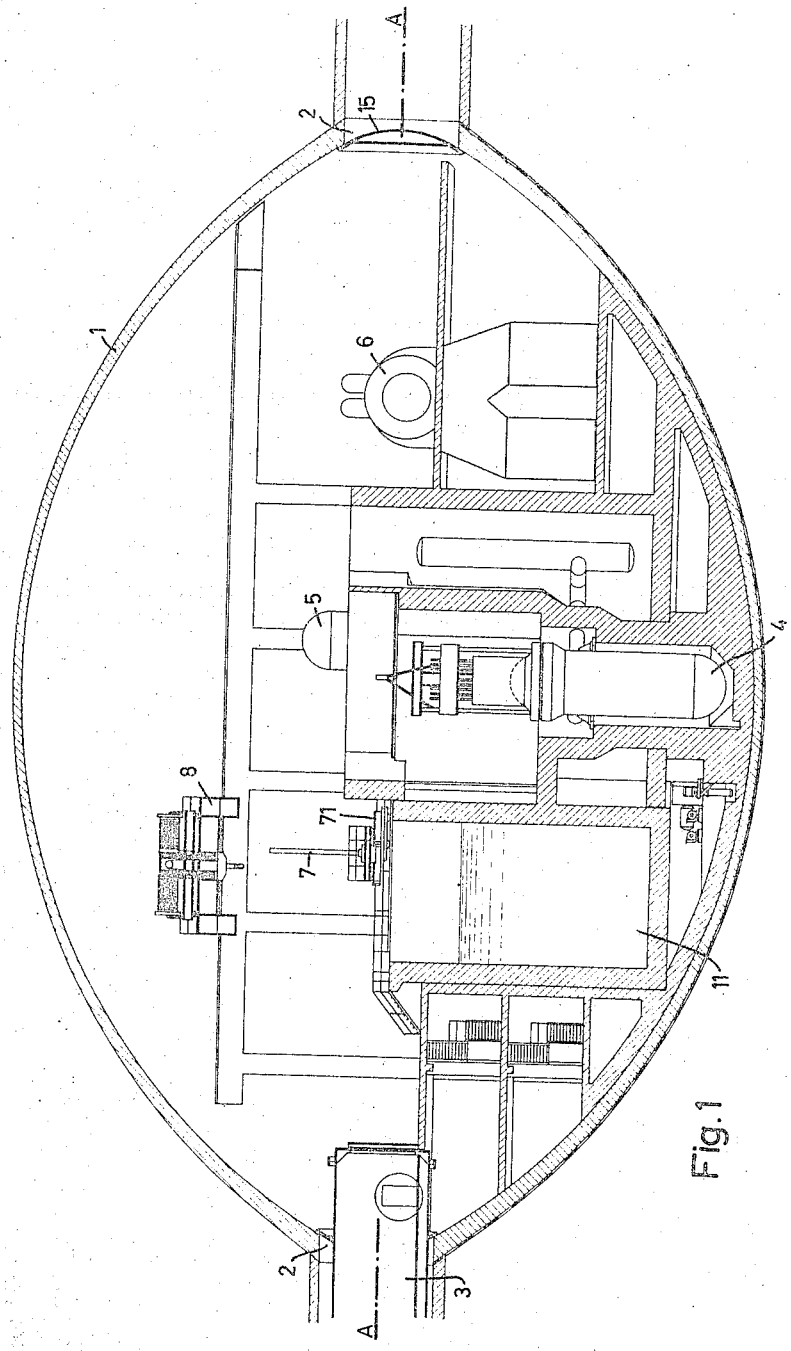
FIG. 1 shows a vertical longitudinal section through the reactor containment structure in accordance with our invention.
Figure 3:
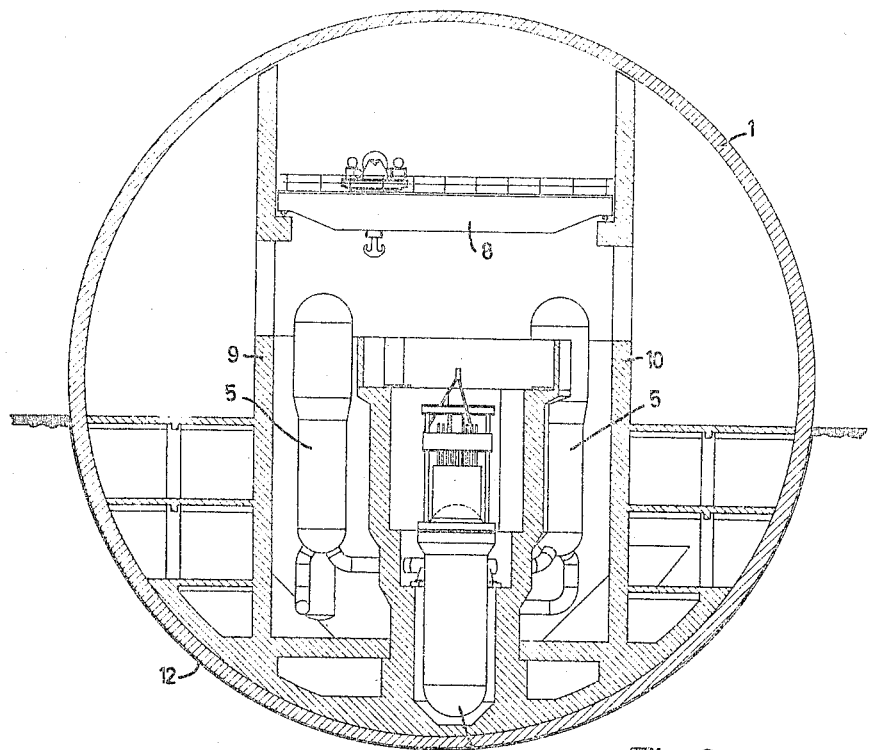
FIG. 3 is a transverse section of FIG. 2 taken along the line III—III in the direction of the arrows.

Referring now to the drawings and particularly to FIG. 1, there is shown a prestressed concrete vessel or shell 1 somewhat in the shape of a football having an arcuate peripheral surface in the longitudinal direction and as shown in FIG. 3 having a circular form in the transverse direction with a radius of about 40 meters, for example, of the embodiment shown. The shell 1 has a rotational axis of symmetry A, as shown in FIG. 1, the surface of the shell 1 being generated by rotation of a downwardly concave arc about the axis. The entire length of the structure is approximately 70 meters whereas the width and height thereof is 45 m. in the embodiment illustrated. The wall thickness at the top of the structure is approximately 60 cm. gradually increasing to about 1 m. in the vicinity described hereinafter which requires the greatest amount of shielding. Differences in thickness also exist in the concrete body in the longitudinal direction thereof, as a result of calculations of its stability or strength as well as building requirements for the structure. The aforementioned values are not absolute values, but are given only to show the order of magnitude or relative dimensions of the structure.

Figure 2:
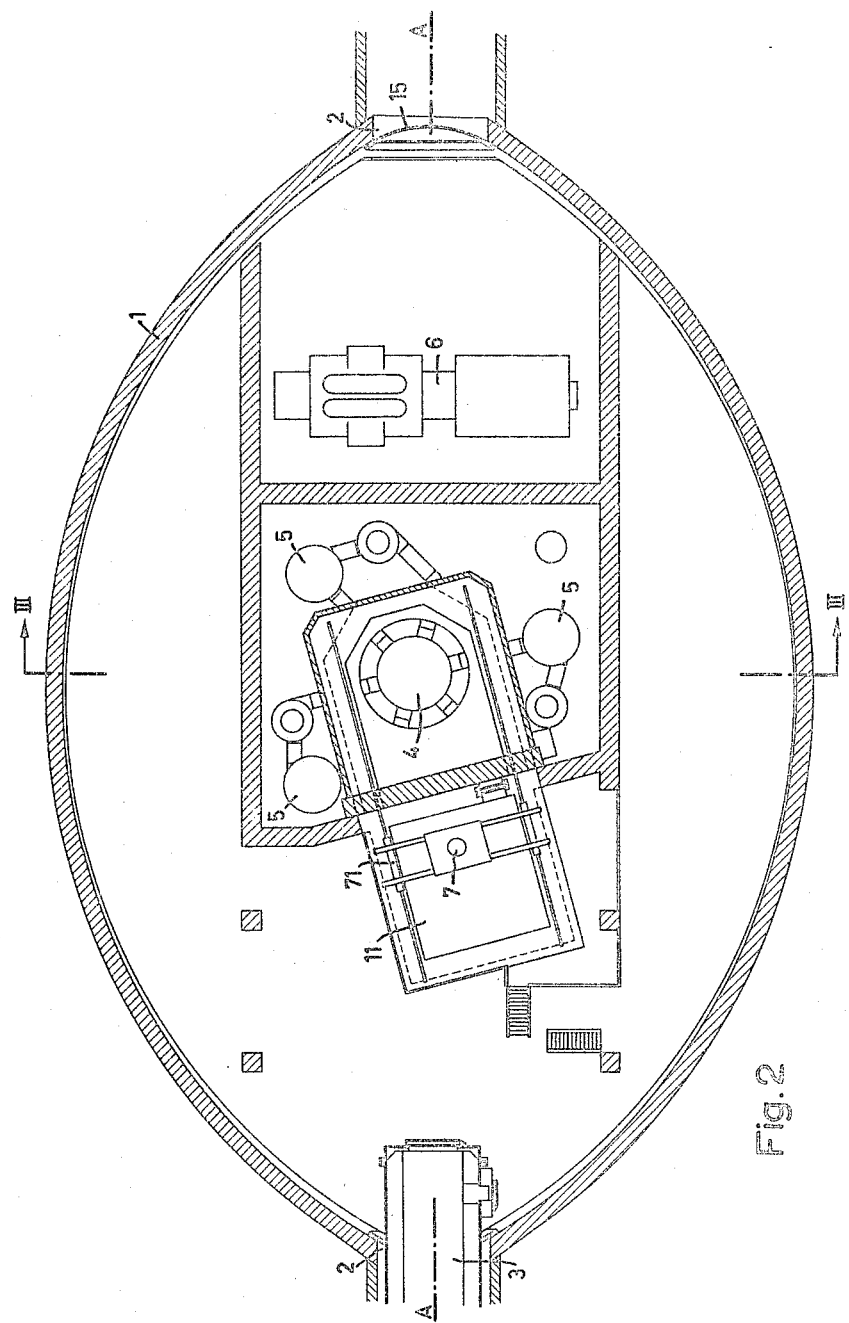
FIG. 2 is a horizontal cross section taken substantially at ground level of FIG. 1.

This structure is purposely inserted about halfway into the ground and the lower half of the concrete shell is consequently provided in a customary manner with a suitable insulating layer 12. As shown in FIG. 1, the points that would normally have been formed by the junction of the arcuate halves of the structure 1 are "cut away" at 2 and a sluice-gate or lock 3 is provided at these locations. These locks 3 are at least large enough to permit the entry of the largest components into the structure. The reactor proper 4 is located almost at the deepest location of the structure and is surrounded by the heat exchanger 5 which delivers the working steam to the turbo generator 6. Above the reactor proper, a loading machine 7 is mounted on the trolley of a crane 71. The crane 71 sweeps the reactor chamber with the loading machine, on the one side, and on the other side, the fuel-storage tank 11 in which the spent fuel elements that are removed from the reactor are inserted to permit the decay of radioactivity. A large overhead crane 8 travels between the walls 9 and 10 extending in the longitudinal direction of the structure. It is essential for the installation of the reactor and the power plant equipment. The walls 9 and 10 can be extended almost up to the ceiling of the structure and be tied together therewith as supporting structural elements for additional equipment that is not shown such as spraying devices for example. The remaining partitioning of the reactor structure is shown in FIGS. 1 to 3 and does not need any further description as it does not form part of our invention. It is only to be observed, however, that it is advantageous to close off the one outlet or exit which does not have to be used regularly during the operation, with a steel plate 15 which presents a convex face at the opening 2 and which, because of its arcuate shape is forced as a result of a reactor accident against the outlet opening at 2 which is thereby sealed. The entire inner wall of the concrete shell is provided with a gas- and corrosion-resistant, leak-proof lining of plastic or sheet metal material for example, which must also be able to cope with the stresses in the event of an accident. Naturally, intermediate spaces can be provided between this lining and the concrete wall for testing against leaks such as for removing by suction the harmful material which possibly penetrates due to an accident.

In the illustrated embodiment of this invention, as has been described above, there is provided a very advantageous ratio of the ground area to the entire volume of the reactor containment structure so that practically the entire primary installation or the entire power plant can be installed therein. Furthermore, the large volume produces a smaller increase in pressure in the event of a very large or even catastrophic accident than with the usual reactor structures so that the safety of the entire installation is essentially increased. Naturally, additional safety devices can also be installed in the interior of this reactor structure, for example for condensing discharging water vapor, such as spray devices and the like, as has been known and employed in the art until now. Because of the favorable space ratios, the use of such devices is even more simplified and efficient.

Figure 4:
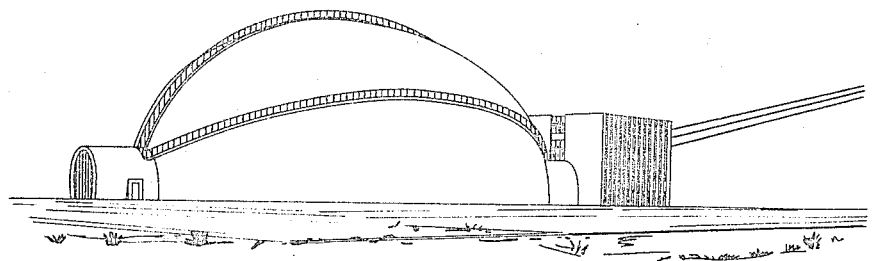
FIG. 4 is a perspective view of the reactor containment structure as seen from the outside.
Figure 5:
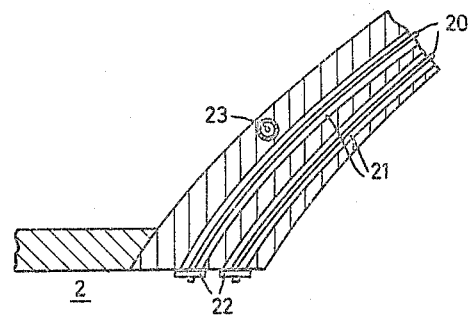
FIG. 5 is an enlargement of the containment shell adjacent the left hand access opening of FIG. 1 showing transverse and longitudinal prestressing members.

FIG. 4 shows an outer view of the reactor structure which is able to be approached and inspected from the outside by three particularly important paths i.e. at ground level and on two catwalks. In this manner, outlet valves and other devices located on the outside of the containment structure can be easily controlled and inspected.

While the prestressing of double curved shells generally encounters great difficulties, stressing cables 20 can be applied and stressed in a relatively simple manner in the novel safety containment structure of our invention. The stressing members 20 are arranged so that they are displaceable longitudinally in encasing tubes 21 embedded in the concrete forming the shell and those stressing members are stressed after the concrete has hardened and are secured or anchored to the hardened concrete by suitable means as at 22. The stress members are positioned stepwise in the longitudinal direction in accordance with the static requirements, such as in accordance with the anticipated pressure from a possible explosion for example, and in fact in such a manner that the stress members can be stressed from stressing locations at the access openings or from the vicinity thereof outwardly, and anchored at the opposite end in the portion of the rotational shell located opposite the corresponding opening. Each half, respectively, of all the necessary stress members is stressed from the stressing position of one position of one opening or from the vicinity thereof outwardly with the result that all of the stress members are drawn over the apex of the shell having the greatest stress.

The stress members 23 necessary in accordance with the static requirements in the transverse or circular direction of the structure can for example comprise four component members respectively that overlap or are end connected to form rings which is customary for round prestressed concrete structures. The stressing of these stress members occurs in recesses that are located in the shell for this purpose. The stresses which form in the shell due to a temperature difference between the inner and outer concrete fibers are taken care of by a loose reinforcement.

We also provide a method of building a reactor containment structure which comprises the steps of erecting a self-supporting network consisting of steel rods and pouring the concrete shell on this form holder which serves as scaffolding. One can proceed in such a way that a form for a thin concrete shell approximately 10 cm. thick is produced in a first operation on the aforementioned network of steel rods or light scaffolding of another shape. In accordance with the strength necessary to support a load, by applying additional concrete in further operations or steps of the process, the shell attains the final thickness of the housing wall. By means of a tight connection, the innermost concrete shell which serves as the form in the first place, can be used also for the structural concrete. If the rotational shell is clad on its interior with a gas-tight sheet-metal lining, it can moreover be connected quite advantageously to the network which is to be retained partly in the structure, and thus also serve as the form.

Usually a structure of this type is set approximately halfway into the ground so that the openings in the ends lie on the ground level. Under these conditions, as viewed from the horizontal at the reactor up to about an angle of 45°, the prestressed concrete shell is strengthened on all sides so as to provide the necessary shielding in the event of an accident. This strengthening or thickening of the shell can nevertheless be omitted, if the structure is sunk deeper into the earth or if the side walls are covered with a sufficiently thick layer of earth, for example with the excavated material from the cavity in the ground in which the lower part of the structure is inserted.

It is understood of course, that depending upon its required size the structure can be built in part or entirely of other materials such as steel, plastic-reinforced glass fibers and the like.

We claim:

1. Containment structure for nuclear energy plants having a nuclear reactor and auxiliary equipment, comprising a hollow elongated vessel for housing the nuclear reactor and auxiliary equipment, said vessel being symmetrical and having a surface generated by rotation of an arc about a substantially horizontal line coinciding with the longitudinal axis of said vessel, the ends of said arc being spaced from said substantially horizontal longitudinal axis so as to provide end openings into said vessel; and shielded lock means located at said end openings, said lock means being pressure-tightly lockable against the escape of radiation products from said vessel.

2. Containment structure for nuclear energy plants having a nuclear reactor and auxiliary equipment, comprising a hollow vessel having a horizontal longitudinal axis, and being adapted to house the nuclear reactor and auxiliary equipment said vessel being symmterical and having a surface generated by rotation of a downwardly concave arc about said horizontal longitudinal axis, the ends of said arc being spaced from said horizontal longitudinal axis so as to provide end openings into said vessel; and shielded lock means located at said end openings, said lock means being pressure-tightly lockable against escape of radiation products from said vessel.

3. Containment structure according to claim 2, wherein the walls of said vessel, up to about an angle of 45° above the horizontal axis, taken from the center of said vessel, are thicker so as to shield against escape of radiation from said vessel.

4. Containment structure according to claim 2, wherein said vessel is formed of a reinforced concrete shell, and a lining of gas-impermeable material is provided on the interior of said shell.

5. Containment structure according to claim 2 wherein said vessel is formed of a reinforced concrete shell, said shell being prestressed both in the transverse direction and in the longitudinal direction from said access openings.

6. Containment structure according to claim 2 wherein said vessel is formed of a reinforced concrete shell, and prestressing means located in said shell for prestressing the same, said prestressing means being anchored to the concrete shell.

7. Containment structure according to claim 6 wherein said prestressing means comprises a plurality of tubes embedded in said concrete shell, and stressing members extending through said tubes, for prestressing said concrete shell.

8. Containment structure for nuclear energy plants having a nuclear reactor and auxiliary equipment, comprising a hollow vessel for housing the nuclear reactor and auxiliary equipment, said vessel having a horizontal axis, said vessel being substantially in the shape of a football except at the ends thereof which are cut away to provide access openings to said vessel; and shielded lock means located at said end openings, said lock means being lockable against escape of radiation products from said vessel.

9. Nuclear reactor installation including auxiliary equipment comprising a hollow containment vessel for the nuclear reactor and the auxiliary equipment, said vessel having a horizontal longitudinal axis, said vessel being symmetrical and having a surface generated by rotation of a downwardly concave arc about said horizontal longitudinal axis, the ends of said arc being spaced from said longitudinal axis so as to provide end openings into said vessel, shielded lock means located at said end openings, said lock means being lockable against escape of radiation products from said vessel; a nuclear reactor disposed in said containment vessel; and energy conversion means located adjacent said nuclear reactor in said containment vessel.

10. Containment structure for a nuclear reactor and auxiliary equipment of a nuclear energy plant, comprising a hollow vessel for housing the nuclear reactor and auxiliary equipment, said vessel having a horizontal longitudinal axis, said vessel being symmetrical and having a surface generated by rotation of a downwardly concave arc about said horizontal longitudinal axis, the ends of said arc being spaced from said longitudinal axis so as to provide end openings into said vessel; shielded lock means located at said end openings, said lock means being pressure-tightly lockable against escape of radiation products from said vessel, the nuclear reactor and at least part of the auxiliary equipment being supported on the lower part of said vessel; and wall means located in said lower part of said vessel for shielding the reactor and auxiliary equipment against escape of radiation products from said vessel.

References Cited by the Examiner

UNITED STATES PATENTS

| 1,053,127 | 2/1913 | Golding | 264—31 |
| 1,898,304 | 2/1933 | Kent | 264—31 |
| 2,651,973 | 2/1953 | Elliott | 52—80 X |
| 3,022,238 | 2/1962 | Kolflat | 176—40 |
| 3,115,450 | 12/1963 | Schanz | 176—37 |
| 3,192,121 | 6/1965 | Challender et al. | 176—87 X |

FOREIGN PATENTS

| 640,014 | 4/1962 | Canada. |
| 844,188 | 8/1960 | Great Britain. |

OTHER REFERENCES

Engineering News-Record, Jan. 24, 1946, pages 64, 65 and 66.

Nuclear Power, September 1961, page 84, vol. 6, No. 65.

Reactor Safeguards, Charles R. Russell, published by The Macmillan Co., New York, 1962, pages 131. 132 and 147–150.

REUBEN EPSTEIN, *Primary Examiner.*